(12) United States Patent
Phillips et al.

(10) Patent No.: US 8,347,021 B1
(45) Date of Patent: Jan. 1, 2013

(54) STORING APPLICATION MESSAGES

(75) Inventors: Derek Phillips, Waterloo (CA); Andrew Grieve, Waterloo (CA); Matthew Bolohan, Kitchener (CA); Robert Kroeger, Waterloo (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/249,800

(22) Filed: Sep. 30, 2011

Related U.S. Application Data

(63) Continuation of application No. 12/757,736, filed on Apr. 9, 2010.

(51) Int. Cl.
G06F 12/00 (2006.01)

(52) U.S. Cl. .......................... 711/100; 711/103; 711/104

(58) Field of Classification Search .................. None
See application file for complete search history.

(56) References Cited

U.S. PATENT DOCUMENTS

| | | | |
|---|---|---|---|
| 5,581,691 A | 12/1996 | Hsu et al. | |
| 6,505,201 B1 | 1/2003 | Haitsuka et al. | |
| 6,640,247 B1 | 10/2003 | Kishi | |
| 6,667,751 B1 | 12/2003 | Wynn et al. | |
| 6,795,856 B1 | 9/2004 | Bunch | |
| 6,999,997 B2 | 2/2006 | Clarke et al. | |
| 7,448,039 B2 | 11/2008 | Green et al. | |
| 2003/0051161 A1 | 3/2003 | Smith et al. | |
| 2004/0024794 A1* | 2/2004 | Jain et al. ................. | 707/201 |
| 2004/0103394 A1* | 5/2004 | Manda et al. .............. | 717/126 |
| 2004/0170158 A1* | 9/2004 | Man-Hak Tso et al. ...... | 370/351 |
| 2005/0033803 A1 | 2/2005 | Vleet et al. | |
| 2005/0050045 A1 | 3/2005 | Taira et al. | |
| 2005/0120024 A1 | 6/2005 | Tharpe, Jr. et al. | |
| 2008/0117903 A1* | 5/2008 | Uysal ......................... | 370/389 |
| 2009/0313582 A1 | 12/2009 | Rupsingh et al. | |
| 2010/0229100 A1* | 9/2010 | Miller et al. ................ | 715/745 |

OTHER PUBLICATIONS

Hickson, Ian, "Web Workers: Editor's Draft," W3C.; Apr. 4, 2010, Retrieved from the Internet http://dev.w3.org/html5/workers/ on Apr. 8, 2010 (45 pgs.).

U.S. Appl. No. 12/757,736, by Derek Phillips, filed Apr. 9, 2010.

Office Action from U.S. Appl. No. 12/757,736, dated May 14, 2012, 16 pp.

Office Action from U.S. Appl. No. 12/757,736, dated Sep. 4, 2012, 21 pp.

Response to Office Action dated May 14, 2012, from U.S. Appl. No. 12/757,736, filed Aug. 14, 2012, 9 pp.

\* cited by examiner

*Primary Examiner* — Shawn X Gu

(74) *Attorney, Agent, or Firm* — Schumaker & Sieffert, P.A.

(57) ABSTRACT

The subject matter of this document can be implemented in, among other things, a method that includes receiving, by a process executing separately from a first software application on a computing device, a first message generated by the first software application. The method further includes storing, by the process executing separately from the first software application, the received first message in a volatile memory storage location of the computing device. The method further includes retrieving, by the process executing separately from the first software application, the first message following a termination of the first software application.

21 Claims, 5 Drawing Sheets

| Thread ID | App. Type | Event | Time | Level |
|---|---|---|---|---|
| 001 | Mail | Connection Lost | 02/18/09 14:22:07 | Severe |
| 002 | Calendar | Update Fail | 02/18/09 14:22:58 | Warning |
| 001 | Mail | Connection Restored | 02/18/09 14:24:32 | Info |
| 003 | Mail | App Started | 02/18/09 14:28:14 | Info |

FIG. 4A

| Thread ID | App. Type | Event | Time | Level |
|---|---|---|---|---|
| 001 | Mail | Connection Lost | 02/18/09 14:22:07 | Severe |
| 001 | Mail | Connection Restored | 02/18/09 14:24:32 | Info |
| 002 | Calendar | Update Fail | 02/18/09 14:22:58 | Warning |
| 003 | Mail | App Started | 02/18/09 14:28:14 | Info |

FIG. 4B

STORING APPLICATION MESSAGES

This application is a continuation of U.S. application Ser. No. 12/757,736, filed Apr. 9, 2010, the entire content of which is incorporated herein by reference.

TECHNICAL FIELD

This document relates to storing a message in a memory element, and retrieving the stored message from the memory element.

BACKGROUND

Web applications are software applications that can be accessed via a web browser over a network, such as the Internet. Web applications can be embedded in HyperText Markup Language (HTML) web pages and have become a popular tool for web designers and developers to help create a rich experience for users. Some example web applications include e-mail, calendar, auctions, sales, and customer support among many others.

One reason for the popularity of web applications may be the convenience they offer both developers and users. Because web applications are typically hosted on a web server and accessed using a web browser as a thin client, web application software may be updated and maintained on the server. Updates and maintenance, therefore, are often seamless to the end user. As such, web applications may alleviate many of the distribution and installation headaches that occur with other software applications.

As with other software applications, however, web applications are not invulnerable to crashes or other bugs. Even the simplest web applications may contain code that causes the application to perform inefficiently, or to not perform at all. In addition, interactions between the web application and the browser or other system components may cause the web application to terminate unexpectedly. For this reason, developers may include message logging within the web applications to help identify application events, error codes, and the like. These logs may provide valuable information related to debugging the web application or otherwise analyzing the performance of the software.

SUMMARY

In general, this document describes techniques for using a logging process or worker application running separately from one or more software applications on a computing device to store and retrieve messages generated by the one or more software applications. The logging process may be a "long-running" process that continues to execute even if some or all of the software applications terminate, and the stored messages may be retrieved by the process following such a termination of the one or more software applications.

In storing the messages, which may include log messages, stack traces, latency timings, crash logs, impression counts, and the like, the process may store the messages in a volatile storage location of a mobile device. For example, the process may store the messages in a main memory of the mobile device, such as in a memory heap that is allocated to the process. At some later time, the process may optionally transmit some or all of the messages to a server, or may persist some or all of the messages in a non-volatile storage medium of the mobile device. Among other things, retrieved messages may be used to determine a cause of the termination of the one or more software applications, or to otherwise analyze or troubleshoot the operation of the software application, for example.

A single logging process may also be shared by two or more software applications, and the process may interleave the messages received from any or all of the software applications. An application that terminates may later be restarted and may use the still-running logging process for storage and/or retrieval of its messages.

In one embodiment, a method may include receiving, by a process executing separately from a first software application on a computing device, a first message generated by the first software application. The method may further include storing, by the process executing separately from the first software application, the received first message in a volatile memory storage location of the computing device. The method may also include retrieving, by the process executing separately from the first software application, the first message following a termination of the first software application.

Certain implementations may include one or more of the following features. The process executing separately from the first software application may refrain from storing the first received message in a non-volatile storage location. Alternatively, the method can include storing the first received message in a non-volatile storage location. The received message can be stored in the non-volatile storage location after the volatile memory reaches a threshold capacity level that can be based on a percentage of a total capacity of the volatile memory. The received message can be stored in the non-volatile storage location at a specified time following a previous storing operation in the non-volatile storage location. The received message can be stored in the non-volatile storage location upon determining that the computing device can be idle. The method can include receiving a second message generated by a second software application executing on the device, and storing the received second message in the volatile memory storage location of the computing device. The method can include outputting the received first and second messages in an interleaved format based on a timestamp of when each message was received. The first received message may indicate a latency time between actions associated with the first software application.

In another embodiment, a computer system may include a computing device configured to execute a web browser. The system may further include a first web application executable in the web browser by the computing device, the first web application being configured to generate a first message that relates to operation of the first web application. The system may also include a worker application executable in the web browser by the computing device. The worker application may have allocated memory and may be configured to receive the first message from the first web application, to store the first message in the allocated memory, and to retrieve the first message following termination of the first web application.

Certain implementations may include one or more of the following features. The worker application may refrain from storing the first message in a non-volatile storage location. Alternatively, the worker application can be further configured to store the first message in a non-volatile storage location of the computing device. The first message can be stored in the non-volatile storage location after the allocated memory reaches a threshold capacity level that can be based on a percentage of a total capacity of the allocated memory. The first message can be stored in the non-volatile storage location at a specified time following a previous storing operation in the non-volatile storage location. The first message can be stored in the non-volatile storage location upon determining that the computing device is idle. The computer system can include a second web application executable in the web browser, the second web application being configured to generate a second message that relates to operation of the second web application. The worker application can be further configured to receive the second message from the second web application, and to store the second message in the allocated memory. The worker application can be further configured to output the first and second messages in an interleaved format based on a timestamp of when each message was received by the worker application. The first message may indicate a latency time between actions associated with the first web application.

The techniques described herein may provide one or more of the following advantages. In some implementations, a long-running process may provide quasi-persistent storage of log messages or other data without writing to a database residing on the client device or transmitting the messages to a server, either of which can be expensive from a performance standpoint. For example, writing a log message to the database can include write-locking the database, which may limit or prevent other access to the database, at least temporarily. In addition, tying up the antenna of a mobile device to send log messages to a server may degrade communication performance of the mobile device. These overhead costs associated with traditional persisting by the application of such information to the database or of transmitting the information to the server may be minimized in some implementations.

The details of one or more embodiments are set forth in the accompanying drawings and the description below. Other features, objects, and advantages will be apparent from the description and drawings, and from the claims.

BRIEF DESCRIPTION OF DRAWINGS

FIGS. 4A and 4B are diagrams illustrating example message logs.

Like reference symbols in the various drawings indicate like elements.

DETAILED DESCRIPTION

In general, this disclosure describes techniques for storing messages from software applications (e.g., web applications) in a quasi-persistent manner using one or more processes (e.g., web workers) running separately on a computing device. Because the web worker executes separately from the web application it is monitoring, termination of the web application does not result in a loss of the messages generated by the web application. In some implementations, the web worker may be a long-running process with its own allocated memory, such that logged messages may be retrieved using the web worker following a crash of the web application even if the messages have not been stored in a persistent data store. Although this disclosure describes various implementations using web applications and web workers specifically, it should be recognized that these implementations are provided as examples, and that other software applications and processes may also be utilized to achieve a similar result.

Figure 1:
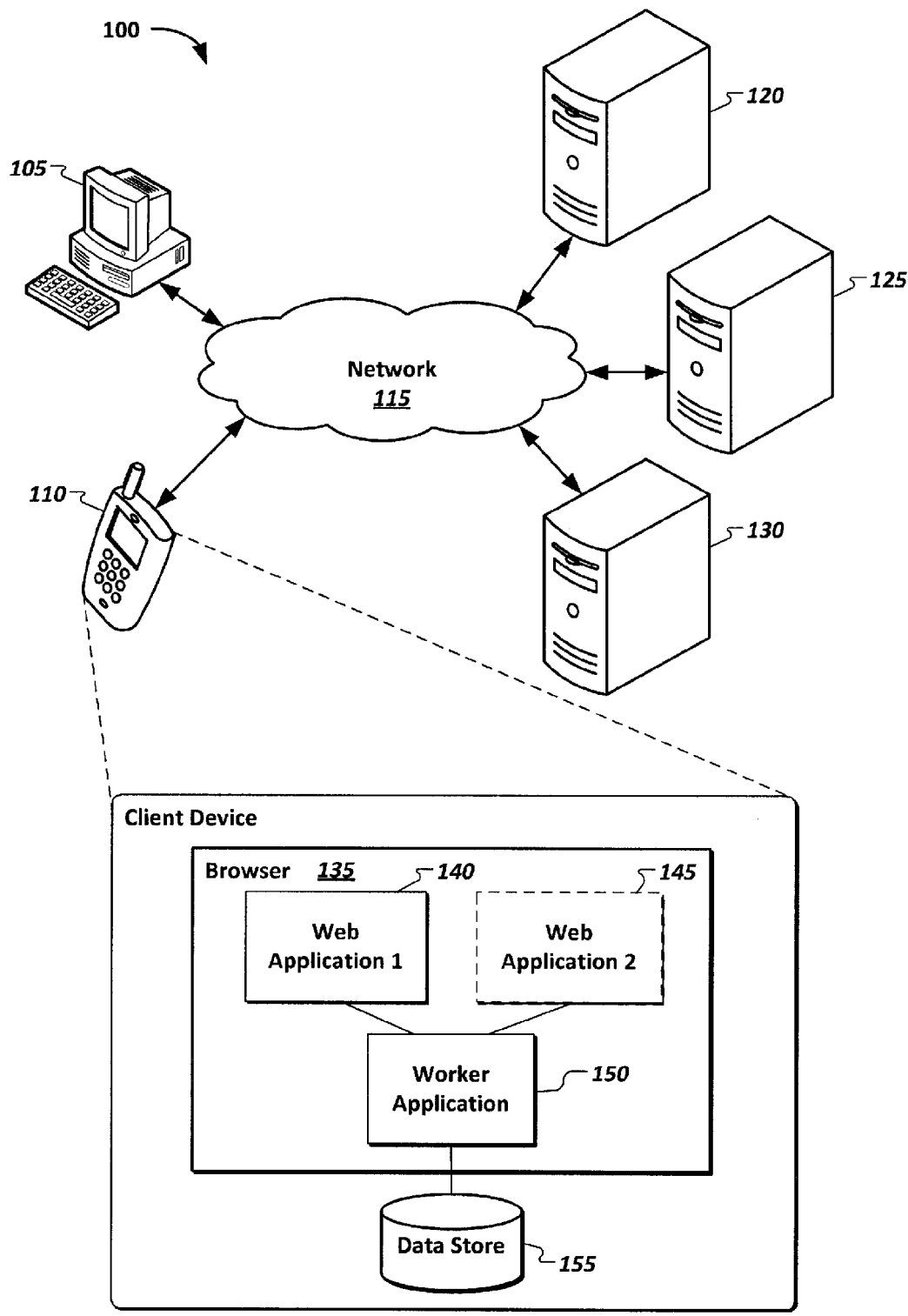
FIG. 1 is a conceptual diagram illustrating a networked computing environment with web applications running on a browser of a client device.

FIG. 1 is a conceptual diagram illustrating a networked computing environment with web applications running on a browser of a client device. The client devices 105, 110 can be any type of client device, including any type of computer (e.g., desktop computer, workstation, notebook, mainframe, terminal, etc.), handheld device (personal digital assistant, smart phone, etc.), or the like. The client devices 105, 110 may have the capability to communicate over a network 115 (e.g. Internet, telephony, LAN, WAN, or combination thereof) with one or more servers 120, 125, 130. The client devices may support a browser 135 and appropriate networking applications and components. In the example system 100, client devices 105, 110 communicate electronically over network 115 with servers 120, 125, 130.

In the example networked environment of FIG. 1, servers 120, 125, 130 may be configured as web servers and may each host a web application that can be accessed via one or more client devices 105, 110. In general, a web application is a computer software application (e.g., a Java applet) hosted within a computing environment, such as a browser-based environment. Web applications may be coded in browser-supported languages (e.g., JavaScript combined with markup language such as HTML). A worker application, sometimes referred to as a web worker, is a type of web application that is typically used to execute long-running background scripts that are separate and independent from any web applications running in the browser. Web workers are discussed in more detail in the World Wide Web Consortium (W3C) HTML 5 draft standard describing Web Workers, which is incorporated by reference herein in its entirety as background information.

In the networked environment, one or more web applications may be configured to communicate with one or more web workers to accomplish various tasks. The web applications may be hosted on one or more servers, and each server may host one or more web applications. For example, server 120 may host web application 140, and server 125 may host web application 145. Similarly, another server 130 may host a worker application 150. These and other web applications may be obtained by the client devices using a network connection with the appropriate server. For example, when a user of a client device navigates to a web page that contains a reference to a web application hosted on one of the web servers, the client device may download the web application and begin executing the application in an appropriate web browser 135.

A single browser 135 may be used to concurrently run multiple web applications 140, 145. For example, both an e-mail and a calendar web application can be displayed in different pages or tabs of browser 135, or may be displayed on the same page in the browser. Similarly, one or more workers applications 150 may also run concurrently with the web applications 140, 145 in browser 135. The web applications 140, 145 and worker application 150 each may execute as a different thread or process within the browser such that, if one application terminates while the browser is still running, the other web application may remain unaffected.

During operation, web applications may generate various messages related to their execution. For example, a web application may be configured to generate a running log that identifies various information related to user interaction, system interaction, application processing, etc. Different types of messages may include application events (when the application is started, when a click event is detected, when a scroll event is detected, etc.), operational information (latency times, impression counts, usage statistics, stack traces, etc.), or the like. In the case of a calendar web application, some example messages may include the following: Application Started, User-Selected Month View, New Meeting Request, Database Connection Established, Event Update, and other appropriate messages.

These messages may be stored in various ways by the web application. For example, the messages may be stored persistently or temporarily. Persistent storage may include writing the messages to a local data store 155 such as a database on the client device, writing the messages to a network data store on a server (not shown), or writing the messages to another type of permanent storage. Any of these persistent storage options may cause some degradation in the performance of the web application and/or the client device (e.g., additional processing times may be incurred based on creating a separate connection to a server, generating and transferring network packets using the appropriate communications protocol, using the device's antenna for transmittal, locking the database for integrity purposes, etc.). Temporary storage, on the other hand, may include storing the messages in allocated memory that is dedicated to the web application. However, temporary storage in the web application's allocated memory space means that the messages may be lost if the application terminates for any reason.

In some implementations, a worker application may provide another option for storing the messages generated by the web application. For example, a worker application running in a separate thread from the web application may store the web application messages in a quasi-persistent manner by storing the messages in memory that is allocated to the worker application rather than the web application memory. Since the worker application runs in a separate thread, if one or more of the web applications fail or terminate for any reason, messages that have been logged using the worker application are still safely stored in the memory of the worker application, and can therefore be subsequently retrieved as long as the worker is still running.

In some implementations, quasi-persistent storage may be accomplished using a shared or dedicated web worker that may store messages in the memory allocated to the web worker. Shared web workers may be associated with multiple web applications, while dedicated web workers are specifically associated with a single web application. Either type of web worker may be utilized in performing the techniques described herein.

In the case of a shared web worker, the web worker thread may be instantiated when a first web application calls the web worker, such as by including a reference Uniform Resource Identifier (URI) that points to the shared web worker. Subsequent web applications that reference the same web worker may first check to see whether an instance of the web worker is operating in the browser, and if so, connect to the already-running web worker. And, if the web worker is not already running in the browser, the subsequent web application may instantiate the web worker.

Quasi-persistent storage may provide a storage option that does not depend on a still-running web application to store messages, but if the web worker crashes, any messages stored in the memory of the web worker may be lost. As such, in some implementations, the web worker may save the messages in one or more persistent storage locations, such as those described above. In other implementations, the messages may never be stored to a persistent storage location.

The web worker may save the quasi-persistently stored messages to persistent storage based on a configured and/or configurable basis. For example, the web worker may be configured to store the messages persistently on a periodic basis (e.g., once a minute), on the occurrence of a specific event (e.g., web worker memory becoming too full), when the device has spare processing cycles available (e.g., if the device is idle for a specified period of time), etc. Because the web worker may determine when to persist the messages to a data storage device, persisting data using the web worker rather than directly through the software application may decrease the overhead associated with persisting the messages.

Figure 2:
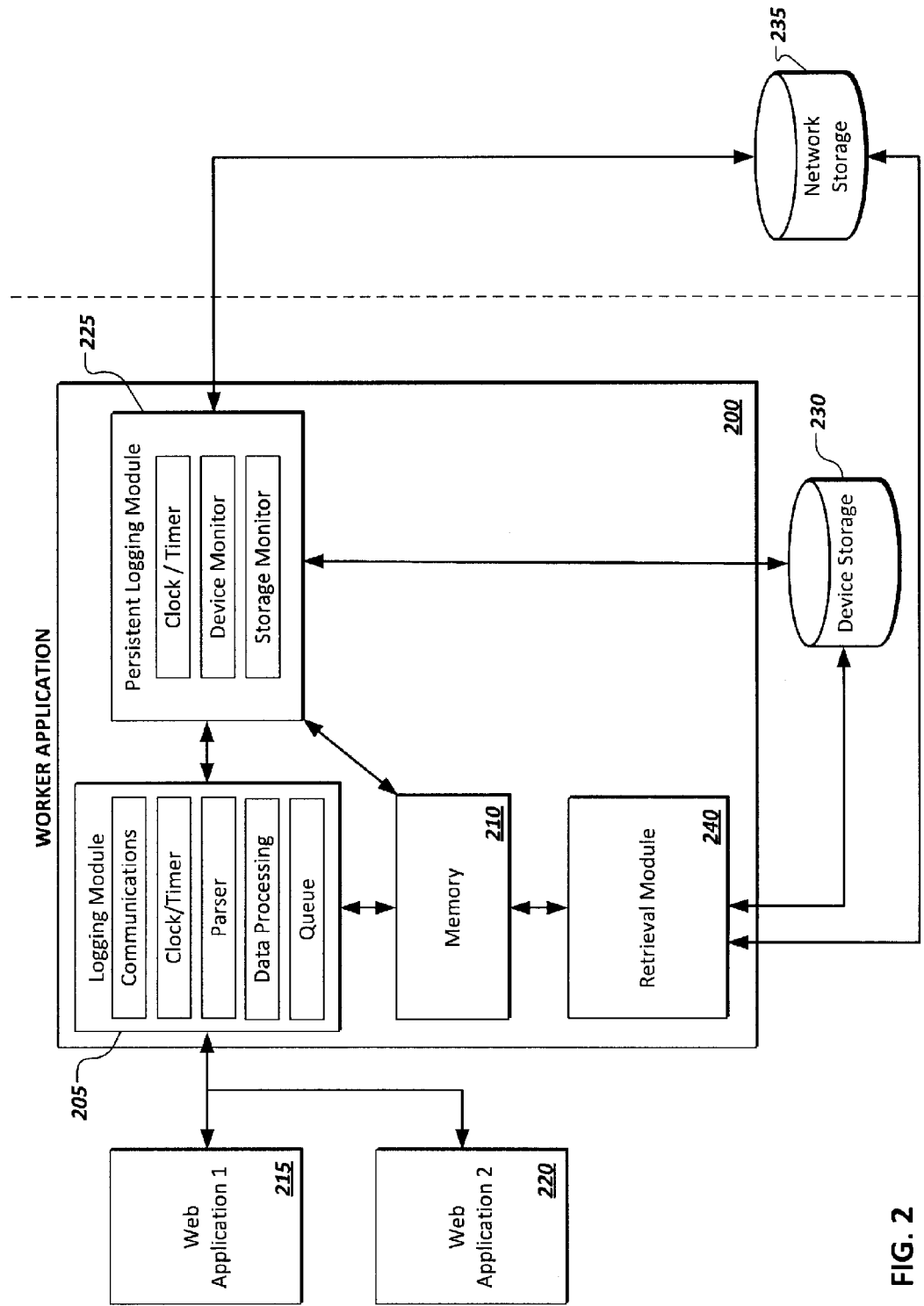
FIG. 2 is a block diagram illustrating example components of a worker application.

FIG. 2 is a block diagram illustrating example components of a worker application 200. In the example, multiple web applications 215, 220 are communicating with a single shared worker application. The example shows two web applications communicating with the shared worker application, but it should be understood that any number of web applications may be configured to share the worker application. As described above, a worker application may also be implemented as a dedicated worker application that is specifically configured to receive messages from a single web application. The example components shown are representative of either a shared worker or a dedicated worker application.

The shared worker application shown in FIG. 2 includes a logging module 205 that receives application messages from one or more web applications 215, 220. For example, a web application may generate a message that relates to a Start Event indicating that the web application was started. The Start Event message may be communicated to the logging module 205 using any appropriate communication technique. For example, in some implementations, the web application may be configured to push all application messages to the logging module 205 as soon as the messages are generated. In other implementations, the logging module 205 may be configured to monitor the web application to pull messages that have been generated. For example, the logging module 205 may monitor a message queue associated with the web application where the messages are stored until the logging module 205 reads them into memory. The messages may be received by the logging module individually as they are generated, as part of a batch of messages from a single web application, as part of a batch of messages from multiple web applications, or in any other appropriate combination.

The logging module 205 may include one or more sub-modules, such as a communications module to coordinate interactions with the web applications; a clock/timer module to identify when messages are received, and to perform timed tasks such as batch storage operations; a parser to separate and/or identify relevant portions of messages; a data processing module to filter messages or apply other rules to the messages; and/or a queue to store messages that have been received and are awaiting processing.

As an example of processing that may occur, the logging module 205 may wait until a specified time (e.g., 2 minutes after receiving a previous message) identified by the clock/timer module. At the specified time, the communications module may poll a message queue for each of the web applications that the worker application is monitoring, pulling each of the messages in the respective queues for processing, and storing all of the messages in a processing queue. The logging module 205 may use a parser to identify the type of message received (e.g., a non-critical level event message from web application 215), and may use the data processing module to determine how to store the received message (e.g., in volatile memory for a period of time, and in non-volatile storage after the period has expired). This example illustrates one specific implementation and configuration, but other configurations are possible, depending on the desired effects of the logging module. Different configurations or options may be provided by the software developer (e.g., via variables or constants programmed in code defining the various options), by the end user (e.g., via a user interface that allows the user to select one or more optional configurations), or some combination thereof.

Regardless of the processing that occurs in the logging module 205, the received messages from the one or more web applications 215, 220 may be stored to a memory 210 that is associated with the worker application. The memory 210 represents a volatile memory location, such as a memory heap associated with the worker application. Because the messages are stored in the memory of the worker application rather than (or in addition to) the memories of the web applications themselves, even if one or more of the web applications terminate, the messages may be stored and retrievable by the worker application in a quasi-persistent manner.

The worker application also includes a retrieval module 240 that may be configured to access messages and associated data stored in volatile memory 210. In some implementations, the retrieval module 240 may be configured to retrieve the stored messages upon request by one of the web applications. For example, if the web application desires access to a message that it generated, but that had been subsequently removed from its memory, the web application may request that the retrieval module 240 recover the message from memory 210. The retrieval module may also retrieve messages automatically upon the occurrence of a particular event. For example, if the worker application determines that one or more of the web applications has terminated, the retrieval module 240 may retrieve all or some of the messages associated with that particular web application from memory 210. Such retrieved messages may be useful for purposes of debugging the web application, analyzing application performance, and the like.

Following retrieval, the messages may be processed in some manner by the worker application and/or distributed to other components within the system, depending on how the messages are to be used. For example, in some implementations, after a terminated application is restarted, the worker application may send some or all of the messages to the restarted application so that the restarted application can recreate certain state information associated with the previous session, or so that the application can diagnose the cause for the termination. In other implementations, the messages may be sent as part of a message log to a developer to assist with debugging of the application.

The worker application may also include a persistent logging module 225 that may be used to save the messages to more permanent data stores, such as device storage 230 on the local device, or to network storage 235 that is external to the local device. Persistent storage of some or all application messages may be useful to ensure that, even if the worker application terminates, the messages are stored and may subsequently be retrieved, such as in the case of a system crash, or a termination of the browser. In some implementations, the retrieval module 240 discussed above may also be configured to retrieve messages that have been persisted to device storage 230 and/or network storage 235.

Similar to the logging module, 205, the persistent logging module 225 may also include various sub-modules. Such sub-modules may include, but are not limited to, a clock/timer module to identify when certain storage tasks are to be completed; a device monitor module to identify device conditions such that the persistent logging module can determine the best time to perform an operation; and/or a storage monitor to determine how much of the volatile memory is being utilized.

In some implementations, a clock/timer module may be used to store messages received by the logging module 205 into a persistent memory store based on the configuration of the worker application. For example, the worker application may be configured to store messages previously stored in memory 210 at a particular time (e.g., at 2:00 am every day, or at 3:00 am every weekday, etc.), at a specified time interval (e.g., every minute), or at a specified time following a previous storage event (e.g., three hours after a user's previous instructions to persistently store the application messages).

In some implementations, a device monitor module may be used to store messages to the persistent memory store based on the status of the client device. For example, the device monitor module may monitor one or more processors of the client device to determine when its processors are idle, and may store the messages to the persistent memory store when at least one of the processors is free. In another example, the device monitor module may identify certain device events that indicate a persistent storage is appropriate (e.g., during shutdown of the device; before closing the browser; when the network connection is lost; when a high-speed network connection is available; upon a specific button press by the user; etc.).

A storage monitor module may also be used to store messages to the persistent memory store based on the available memory of the worker application. For example, messages stored in the memory 210 may be persisted to a persistent storage location such as a local database 230 when the storage monitor module determines that a certain threshold percentage of the memory 210 is being utilized (e.g., when the memory is 80% full). Similarly, the messages may be persisted if a certain specified amount of memory has been allocated by the worker application (e.g., 400 kb).

Determining when to persistently store the messages from memory 210 may be based on any combination of the example configurations described above. For example, in some implementations, the worker application may persist the stored messages to a network storage location 235 at a specified time after the memory 210 becomes 80% full. In other implementations, the messages may be persisted at a next idle time following a specified time interval (e.g., the next available clock cycle after a one minute interval has elapsed). In still other implementations, the messages may be stored to the local device storage 230 upon the next idle time after the memory 210 becomes 90% full. These and other configurations or options may be provided by the software developer (e.g., via variables or constants programmed in code defining the various options), by the end user (e.g., via a user interface that allows the user to select one or more optional configurations), or some combination thereof.

The configurations and options described above may also be selected based on the calling web application or the client device upon which the application is running. For example, a high-priority application may be configured to ensure that its messages are persisted more frequently than that of a lesser-priority application. Such a configuration may sacrifice some measure of performance in favor of increased reliability for important applications, while maintaining higher performance levels for less important applications. In some implementations, selection of a particular configuration may also or alternatively be based on the number of web applications sharing the worker application. For example, if a greater number of web applications are all sharing a single worker application, the worker may be configured to persist the messages it receives more frequently.

Message persistence options may also be based on the client device upon which the web and worker applications are running. As one example, a certain type of device that is considered less stable than others may cause the worker application to persist the received messages to network storage more often than when the same applications are running on a more stable client device. Similarly, if the worker application determines that a particular device is connected to a high-speed data network, the worker application may persist the messages to network storage more frequently than when the device has a slower connection.

Figure 3:
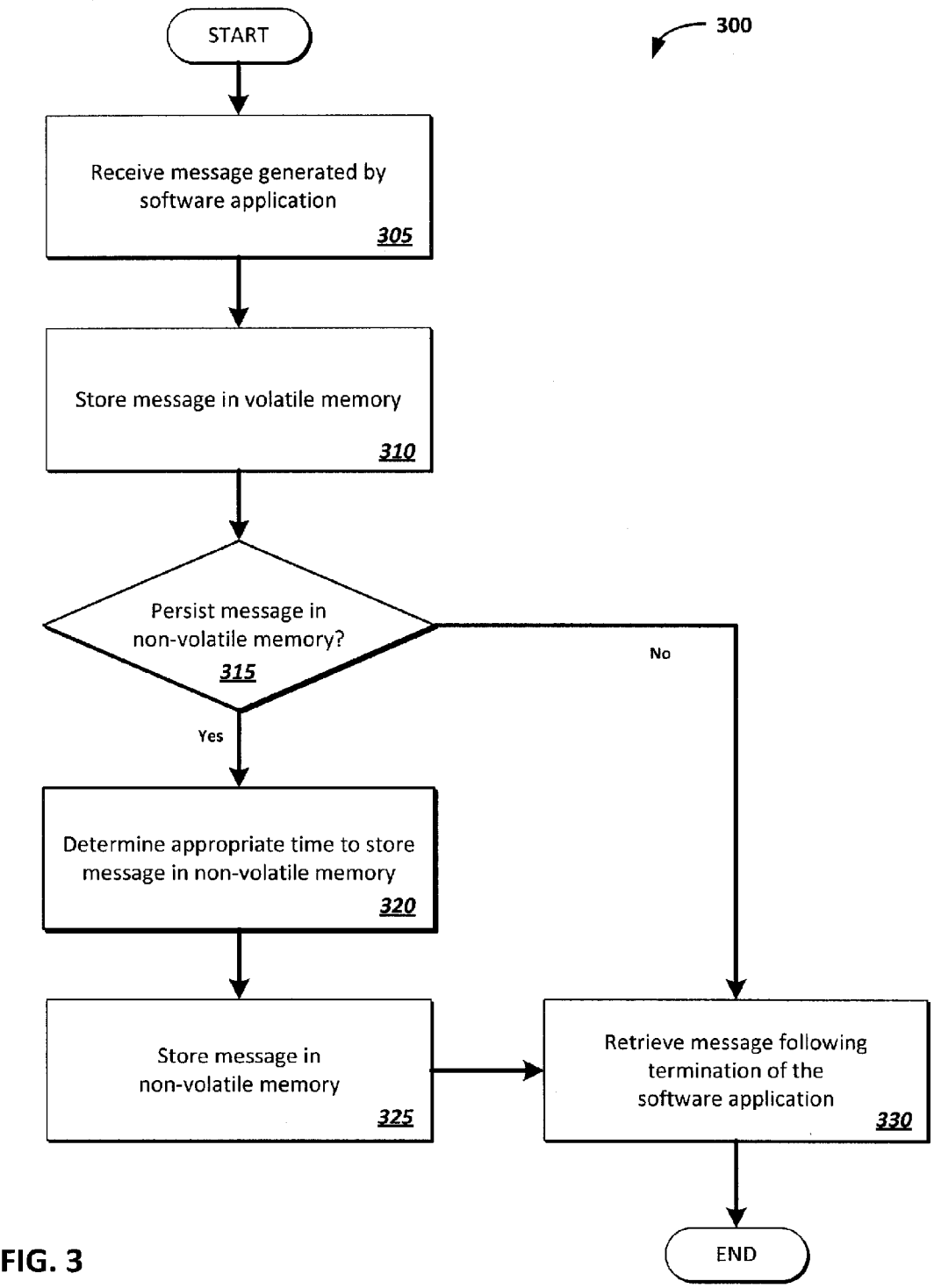
FIG. 3 is a flow diagram illustrating an example process for logging and retrieving messages.

FIG. 3 is a flow diagram illustrating an example process for logging and retrieving messages using a web worker. The process 300 may be performed, for example, by a system such as system 100 and, for clarity of presentation, the description that follows uses system 100 as the basis of an example for describing the processes. For example, the steps shown in the procedure may be implemented by a worker application 150. However, another system, or combination of systems, may be used to perform the process 300.

Initially, a worker application 150 is started within browser 135 and executes in the background as various other software applications also run within the browser in separate processes. The worker application 150 may be started by the first software application that references the worker application, such as via a URI included in the code of the software application. If another software application references the same worker application, the second software application may connect to the existing worker application rather than generating a new worker application.

As the software applications execute, the applications may generate one or more messages related to the application. Such messages may be useful in a variety of situations, including for example, when a developer wishes to debug the application, or when the performance of the application is to be analyzed. These and potentially other messages are communicated to the worker application by the software application. As described, such communication may be either pushed by the software application, pulled by the worker application, or via some combination thereof. In any case, the worker receives a message generated by the software application at block 305. After receiving the message, the worker application may optionally perform some additional processing (e.g., parsing, data processing, etc.) as described above.

At block 310, the received message is stored in volatile memory. For example, the message may be added to the memory heap that is associated with the worker application, where the message can be stored while the worker process is still executing. At block 315, the worker application determines whether the message should also be stored in non-volatile memory. If not, the message remains in the volatile memory associated with the worker, and may later be retrieved following termination of the software application at block 330.

If the worker determines that the message should be stored in non-volatile memory, an appropriate time to store the message is determined at block 320. As described in greater detail above, the determination of when to store the messages in persistent storage may be configurable, and may be based on a number of different factors. For example, the messages may be stored based on a timing algorithm, based on the detection of a device event, based on an evaluation of the memory allocation, etc. At the determined time, the message is stored in non-volatile memory at block 325.

Following storage of the message in non-volatile memory, the message may or may not be removed from the volatile memory location. In some implementations, the volatile memory may retain the messages until the memory space becomes full or nearly full, and then determine which messages have been persisted, and remove those messages from the memory to free up the memory space. In other implementations, message storage may be based on a first-in, first-out system where the earliest received messages are cleared from the memory as new messages are received. In other implementations, the message may be removed from volatile memory immediately or soon after the message is persisted to ensure adequate memory space for incoming new messages.

At block 330, the message is retrieved following termination of the software application, such as after the application crashes. In cases where the message has not been persisted, the message may be retrieved from the volatile memory associated with the worker application. In cases where the message has been persisted and purged from the volatile memory, the message may be retrieved from the non-volatile storage location. Finally, in the case where the message is still stored in volatile memory and has been persisted to a non-volatile storage location, the message may be retrieved from either location.

The retrieved message may then be used for its intended purpose. For example, in some implementations, the message may be sent to software support personnel who may examine the message (and possibly other messages that correspond to a software application that was terminated) to identify possible causes for the termination. Similarly, the message may be displayed to the user of the application with a descriptive error code to identify why the application may have terminated. In other implementations, messages associated with the performance of an application may be sent to a developer or user interested in examining efficiency and performance issues related to the application.

The discussion above relates to the storage and retrieval of a single message from a single software application. However, it should be understood that the worker application may receive, store, and retrieve multiple messages from multiple different software applications in accordance with the example flowchart and the techniques described in this disclosure.

FIGS. 4A and 4B are diagrams illustrating example message logs. These examples message logs may be generated based on the application messages described herein. Message logs may be useful for a number of different purposes, and the logs that are generated may be tailored to the specific purpose for which the log was created. For example, in a log that is created for debugging purposes, the log may include any critical or severe-level messages that were generated by the software application, and may also include the last twenty application messages that were received by the worker application, assuming that the most recent activity leading up to a crash may be the most relevant information for a support person to examine.

As shown in FIG. 4A, various types of information may be included in the application messages, such as a description of the event causing the message, severity level of the event, a time stamp of when the message was generated or received, the type of application that generated the message, the particular thread ID of the application (which may be used to distinguish between messages generated by different applications and/or by different instances of a single application), or other operational parameters.

As shown, the messages from different applications and/or different instances of a single application may be interleaved according to the message timestamp. In some implementations, the interleaving of messages across applications may provide greater insight into the causes of certain behaviors related to the interrelationship between the two separate applications. For example, a browser may have two applications running—a mail web application and a calendar web application. The two applications may be partially integrated such that if a user receives a mail message relating to an event, a button in the mail message may allow the user to add the event to the calendar with a single click. If either of the applications terminate while these events are occurring, the interleaved log messages may be used to create a timeline of what was occurring in each application leading up to the termination. Or, in certain implementations, a message that is recovered from memory may be used to complete the transaction as if the application had never terminated.

In other implementations, the messages may be interleaved in a different manner, depending on the purpose of the log. For example, FIG. 4B shows the messages interleaved based on the thread ID of the message-generating application, which may be useful in quickly examining a timeline of the messages generated by each application separately. The thread ID may be included to distinguish between multiple threads running separate instances of a particular application. As shown, the example message log includes two instances of a mail application that may be running concurrently in the same browser. The thread ID, therefore, may indicate which of the two instances generated the particular message being logged. The interleaving of messages may also be useful for other purposes such as identifying latency timing across multiple applications, or the collection of statistics across applications, for example.

Figure 5:
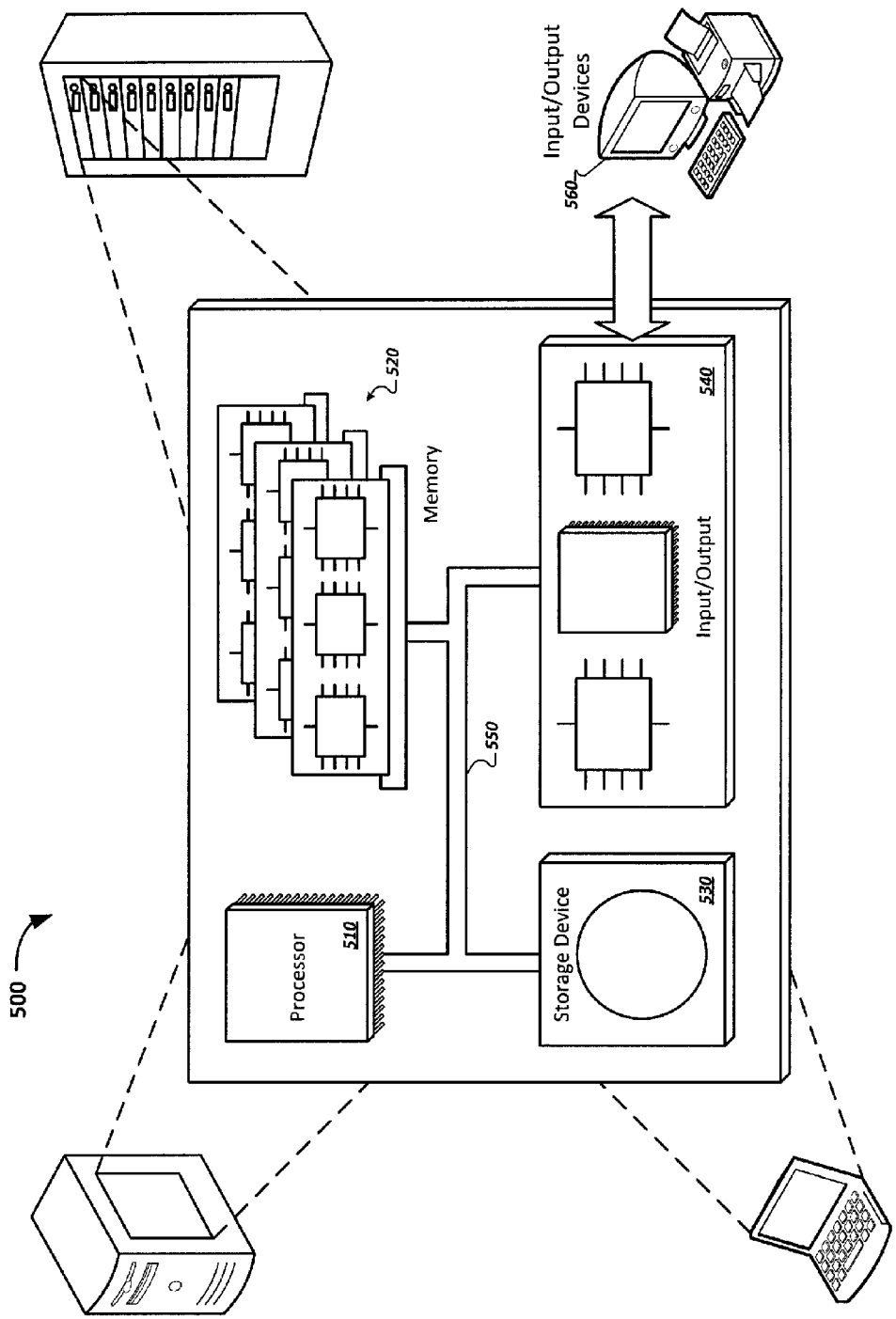
FIG. 5 is a conceptual diagram illustrating example components of a computing system that may be used to implement the techniques described in this document.

FIG. 5 is a conceptual diagram illustrating one example of components of a computing system 500 that may be used to implement the techniques described herein. As depicted in FIG. 5, computing system 500 may include various types of computing devices. For example, a desktop computer, a laptop computer, a network server, or a mainframe computer. Although not depicted in FIG. 5, devices incorporated in computing system 500 may also or alternatively include any number of other devices configured to compute and/or communicate via a network, including mobile devices such as mobile phones, personal digital assistants, smart phones, or other mobile devices. Any of these computing devices may be representative of local computing devices 105, 110 depicted in FIG. 1. Any of the computing devices may also be representative of network servers 120, 125, 130 depicted in FIG. 1.

System 500 includes a processor 510, a memory 520, a storage device 530, and an input/output component 540. Each of components 510, 520, 530, and 540 may be interconnected via a system bus 550 for inter-component communications. Processor 510 may be configured to process instructions for execution within system 500. Processor 510 may be a single threaded processor, or may be a multi-threaded processor configured to process various instructions in parallel simultaneously. Processor 510 may be capable of processing instructions stored in memory 520 or instructions stored on storage device 530. In one example, processor 510 may be configured to process instructions to cause a browser 135 to operate on system 500 consistent with the techniques described herein.

System 500 further includes peripheral devices 560. Peripheral devices 560 may include, for example, a monitor or other display device for presentation of visual information to a user of system 500. Peripheral devices 560 may further include one or more input devices to enable a user to input data to system 500, e.g., a keyboard, mouse, touchpad, trackpad, etc. Peripheral devices 560 may further include printers or other devices to output information. In one example, processor 510 may be configured to process instructions to cause a browser, e.g., browser 135 of FIG. 1, to be displayed to a user via a display of peripheral devices 560. Browser 135 may include a dedicated or shared worker application 150 as described herein. Browser 135 may operate on a processor of any of the computing devices described above.

Memory 520 may be configured to store information within system 500 during operation. Memory 520 may be described as a computer-readable storage medium. In some examples, memory 520 is a temporary memory, meaning that a primary purpose of memory 520 is not long-term storage. Memory 520 may also be described as a volatile memory, meaning that memory 520 does not maintain stored contents when the computer is turned off. Examples of volatile memories include random access memories (RAM), dynamic random access memories (DRAM), static random access memories (SRAM), and other forms of volatile memories known in the art.

In some examples, memory 520 may be used to store program instructions for execution by processor 510. In other examples, memory 520 may be used by software or applications running on system 500 to temporarily store information during program execution.

Storage device 530 may also be described as a computer-readable storage medium. In contrast to memory 520, storage device 530 may be configured to store larger amounts of information than memory 520. Storage device 530 may further be configured for long-term storage of information. In some examples, storage device 530 is a non-volatile memory component. In contrast with a volatile memory component, a non-volatile memory may store data whether or not power is supplied to storage device 530. Examples of non-volatile storage devices include magnetic hard discs, optical discs, floppy discs, Flash memories, and other forms of electrically programmable memories (EPROM) or electrically erasable and programmable (EEPROM) memories.

The techniques described here may be implemented according to a computing system 500 as described with respect to FIG. 5 in any combination of digital electronic circuitry, computer hardware, firmware, software, or any combination of digital electronic circuitry, computer hardware, firmware, software. For example, any of the techniques described herein may be implemented via executable program instructions stored in a computer-readable storage medium (e.g., memory 520 and/or storage device 530) that are readable by processor 510 to cause processor 510 to perform the techniques of this disclosure. In other examples, some or all of the techniques of this disclosure may instead or in addition be implemented via dedicated hardware configured for a specific purpose, e.g., a field programmable gate array (FPGA), application specific integrated circuit (ASIC), digital signal processor (DSP), or another like device. The term "processor" or "processing circuitry" may generally refer to any of the foregoing logic circuitry, alone or in combination with other logic circuitry, or any other equivalent circuitry.

Such hardware, software, and firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The described features can be implemented advantageously in one or more computer programs that are executable on a programmable system including at least one programmable processor coupled to receive data and instructions from, and to transmit data and instructions to a computer-readable storage medium. A computer program can be written in any form of programming language, including compiled or interpreted languages, and it can be deployed in any form, including as a stand-alone program or as a module, component, subroutine, or other unit suitable for use in a computing environment.

The described features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as described above. The relationship of client and server arises by virtue of computer programs running on the respective computers and having a client-server relationship to each other.

A number of embodiments have been described. Nevertheless, it will be understood that various modifications may be made without departing from the spirit and scope of the disclosure. For example, much of this document has been described with respect to web applications and web workers, but other forms of software applications may also employ the techniques described herein. As another example, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other embodiments are within the scope of the following claims.

What is claimed is:

1. A method, comprising:
   receiving, by a first application executing at a computing device and separately from a second application also executing at the computing device, a first message generated by the second application, the first message identifying information related to at least one of a user interaction with the second application, a system interaction with the second application, and execution of the second application;
   storing, by the first application executing at the computing device, and in a volatile memory storage location of the computing device, the first message, wherein the volatile memory storage location is allocated to the first application; and
   retrieving, by the first application executing at the computing device, the first message following a termination of the second application.

2. The method of claim 1, wherein the first application executing at the computing device and separately from the second application refrains from storing the first message in a non-volatile storage location.

3. The method of claim 1, further comprising storing the first message in a non-volatile storage location.

4. The method of claim 3, wherein the first message is stored in the non-volatile storage location after the volatile memory storage location reaches a threshold capacity level that is based on a percentage of a total capacity of a volatile memory.

5. The method of claim 3, wherein the first message is stored in the non-volatile storage location at a specified time following a previous storing operation in the non-volatile storage location.

6. The method of claim 3, wherein the first message is stored in the non-volatile storage location upon determining that the computing device is idle.

7. The method of claim 1, further comprising:
   receiving, by the first application, a second message generated by a third application executing on the computer device; and
   storing the second message in the volatile memory storage location of the computing device, wherein the third application is different from the first and second applications.

8. The method of claim 7, further comprising outputting the first and second messages in an interleaved format based on a timestamp that indicates when the first message was received and on a timestamp that indicates when the second message was received.

9. The method of claim 1, wherein the first message comprises one or more of a crash log message associated with the second application, a stack trace message associated with the second application, a latency timing message indicating a time between actions associated with the second application, a message indicating detection of an event by the second application, and a message indicating a time when the second application was started.

10. A computer system, comprising:
    a computing device comprising at least one processor that is configured to execute one or more web applications;
    a first web application of the one or more web applications that is executable by the computing device, the first web application being configured to generate a first message that relates to operation of the first web application, the first message identifying information related to at least one of a user interaction with the first web application, a system interaction with the first web application, and execution of the first web application; and
    a worker application executable separately from the first web application by the computing device, the worker application being associated with an allocation of volatile memory and being configured to receive the first message from the first web application, store the first message in the allocation of volatile memory, and retrieve the first message following termination of the first web application.

11. The computer system of claim 10, wherein the worker application refrains from storing the first message in a non-volatile storage location.

12. The computer system of claim 10, wherein the worker application is further configured to store the first message in a non-volatile storage location of the computing device.

13. The computer system of claim 12, wherein the first message is stored in the non-volatile storage location after the allocation of volatile memory reaches a threshold capacity level that is based on a percentage of a total capacity of allocated memory.

14. The computer system of claim 12, wherein the first message is stored in the non-volatile storage location at a specified time following a previous storing operation in the non-volatile storage location.

15. The computer system of claim 12, wherein the first message is stored in the non-volatile storage location upon determining that the computing device is idle.

16. The computer system of claim 10, further comprising: a second web application of the one or more web applications that is executable by the computing device, the second web application executing separately from the first web application and also from the worker application, and being configured to generate a second message that relates to operation of the second web application, and wherein the worker application is further configured to receive the second message from the second web application, and to store the second message in the allocation of volatile memory.

17. The computer system of claim 16, wherein the worker application is further configured to output the first and second messages in an interleaved format based on a timestamp that indicates when the first message was received and on a timestamp that indicates when the second message was received by the worker application.

18. The computer system of claim 10, wherein the first message comprises one or more of a crash log message associated with the first web application, a stack trace message associated with the first web application, a latency timing message indicating a time between actions associated with the first web application, a message indicating detection of an event by the first web application, and a message indicating a time when the first web application was started.

19. A non-transitory computer-readable storage medium comprising instructions that, when executed, cause one or more processors to:

receive, by a first application executing at a computing device and separately from a second application on a computing device, a first message generated by the second application, the first message identifying information related to at least one of a user interaction with the second application, a system interaction with the second application, and execution of the second application;

store, by the first application executing at the computing device, the first message in a volatile memory storage location of the computing device, the volatile memory storage location being allocated to the first application; and retrieve, by the first application executing at the computing device, the first message following a termination of the second application.

20. The non-transitory computer-readable storage medium of claim 19, wherein the first application executing separately from the second application refrains from storing the first message in a non-volatile storage location.

21. The non-transitory computer-readable storage medium of claim 19, wherein the first message comprises one or more of a crash log message associated with the second application, a stack trace message associated with the second application, a latency timing message indicating a time between actions associated with the second application, a message indicating detection of an event by the second application, and a message indicating a time when the second application was started.

* * * * *